United States Patent [19]

Babbitt

[11] 4,255,075

[45] Mar. 10, 1981

[54] LOADER

[75] Inventor: Albert B. Babbitt, Pontiac, Mich.

[73] Assignee: Premier Forging Press Automation, Inc., Madison Heights, Mich.

[21] Appl. No.: 956,685

[22] Filed: Nov. 1, 1978

[51] Int. Cl.³ .............................................. B65G 65/02
[52] U.S. Cl. .................................... 414/222; 414/730; 414/741; 414/773
[58] Field of Search ............... 414/729, 730, 736, 738, 414/739, 740, 741, 773, 783, 222

[56] References Cited

U.S. PATENT DOCUMENTS

| 1,858,642 | 5/1932 | Ross | 414/741 |
| 2,643,780 | 6/1953 | Rowe | 414/738 |
| 3,235,057 | 2/1966 | Rea et al. | 414/730 X |
| 4,160,507 | 7/1979 | Mullins | 414/741 X |

Primary Examiner—Stephen G. Kunin
Assistant Examiner—Terrance L. Siemens
Attorney, Agent, or Firm—Whittemore, Hulbert & Belknap

[57] ABSTRACT

A loader for a forging press or the like comprising a transfer arm movable from a work pickup station to a work receiving station. A clamp is provided on the transfer arm for clamping and unclamping the work.

3 Claims, 5 Drawing Figures

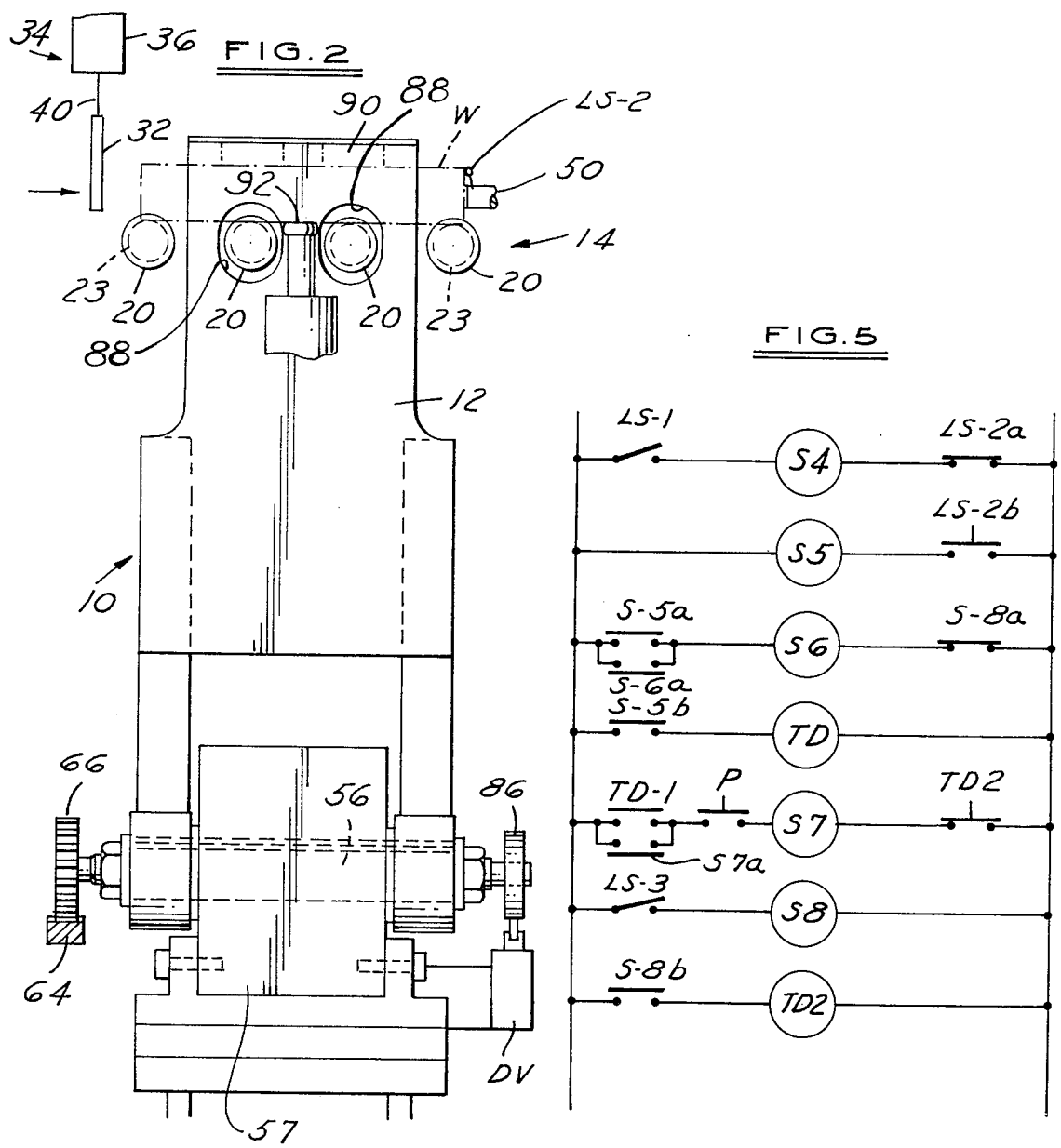

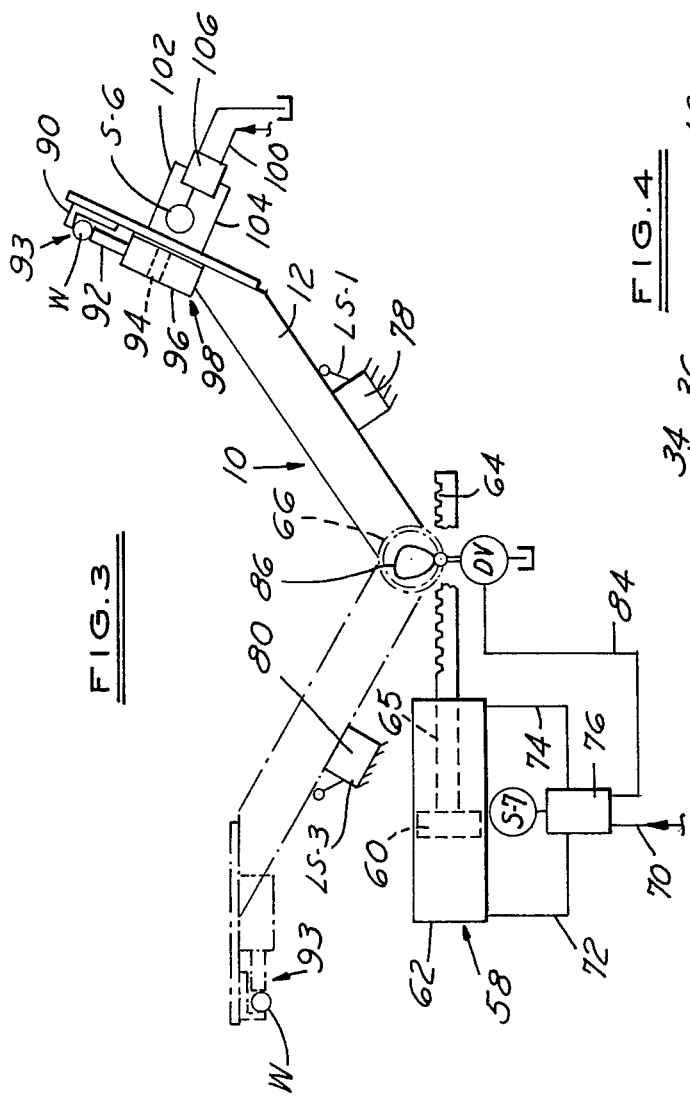
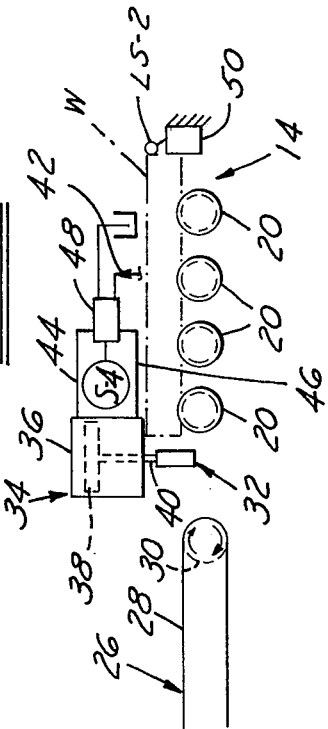

LOADER

SUMMARY OF THE INVENTION

This invention relates generally to loading mechanism and refers more particularly to a loader for a forging press or the like.

The loader comprises a transfer arm movable from a work pickup station to a receiving station on the press. A gate controls the delivery of workpieces to the pickup station. A deceleration valve is provided to slow the rate of movement of the transfer arm during the final stages of its movement toward each station.

In the specific embodiment about to be described, means are provided for closing the clamp to grip a workpiece when the transfer arm is at the pickup station, and then to advance the transfer arm to the receiving station. Such movement of the transfer arm can occur only when the press is open and the receiving station unobstructed. When the transfer arm reaches the receiving station, the clamp is automatically opened to release the work, after which the transfer arm returns to the pickup station.

These and other objects of the invention will become more apparent as the following description proceeds, especially when considered with the accompanying drawings wherein:

FIG. 2 is a view taken on the line 2—2 in FIG. 1.

FIG. 3 is a diagrammatic view of the loader.

FIG. 4 is a diagrammatic view of the pickup station.

FIG. 5 is a wiring diagram.

Figure 1:
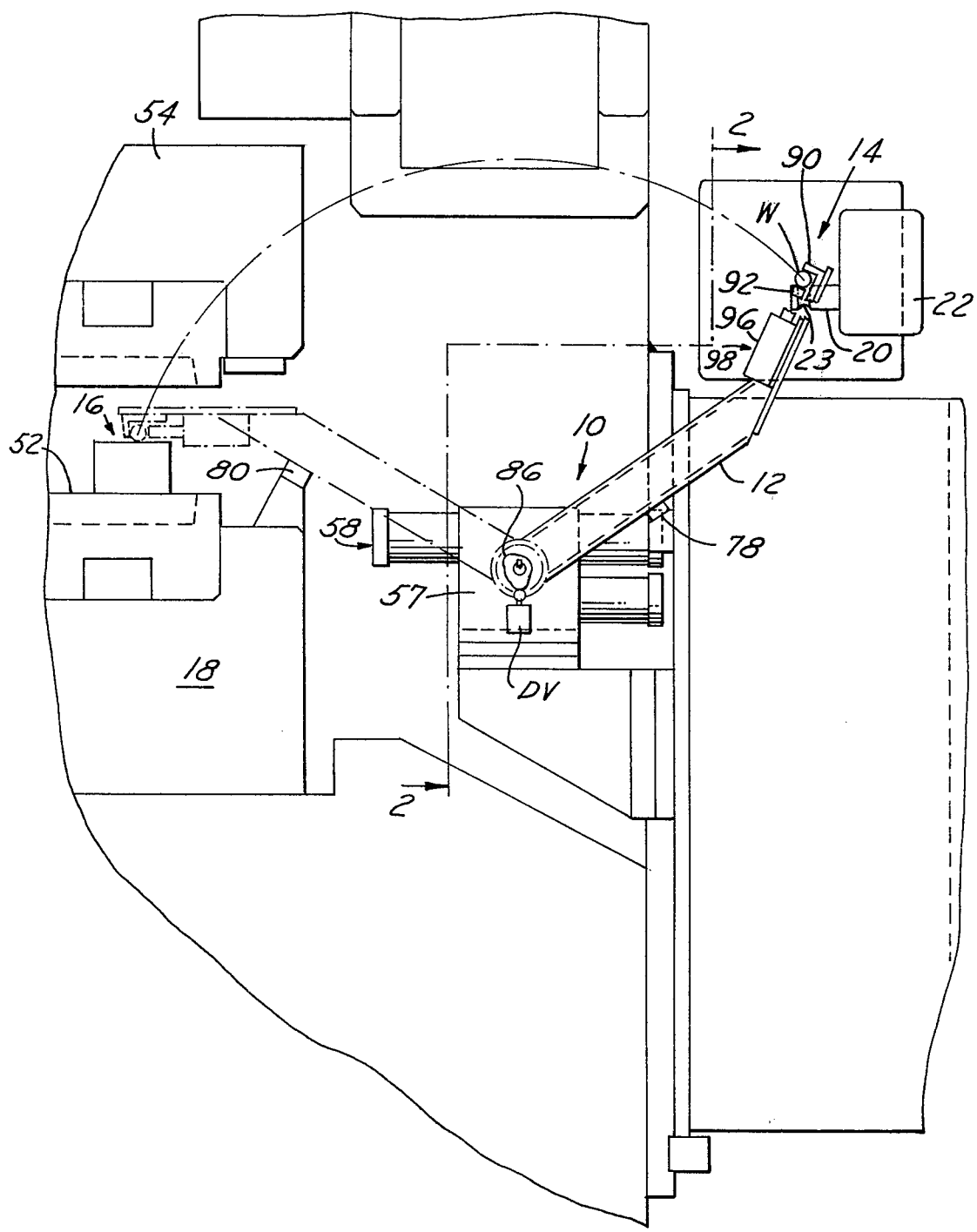
FIG. 1 is a side elevational view of apparatus constructed in accordance with my invention, only a portion of a forging press being shown.

Referring now more particularly to the drawings, there is shown in FIG. 1 a loading mechanism 10 having a transfer arm 12 movable between a work pickup station 14 and a work receiving station 16 on a forging press 18 or the like. The loading mechanism of this invention is not limited to use in connection with a forging press and may be used wherever workpieces are transferred from one station to another. It is believed, however, to have particular utility in the loading of a workpiece in a forging press of the type described in my prior U.S. Pat. No. 3,907,098.

The work pickup station 14 comprises a plurality of laterally spaced elongated support rollers 20. These rollers are supported for free rotation on the housing 22, with their axes extending parallel to one another in a common horizontal plane. Each roller has a reduced annular portion or groove 23 of arcuate cross section near its free end. The grooves together provide a support for a workpiece W extending transversely of the rollers. The workpiece is shown as a cylindrical blank having a radius corresponding to the radius of curvature of the grooves so as to be supported in a stable condition thereupon.

A conveyor 26 to one side of the rollers 20 may be continuously operated in the direction shown in FIG. 4 and is provided to deliver blanks or workpieces W to the pickup station. This Conveyor will be seen to comprise a conveyor belt 28 extending over pulleys 30. The top surface of the belt is generally aligned with the grooved portions of the rollers 20 at the pickup station and moves toward the right in FIG. 4 to deliver the workpieces to the pickup station. A gate 32 is shown in FIGS. 2 and 4 in its normally closed position between the pickup station and the conveyor, blocking delivery of the workpieces to the pickup station. The gate 32 is opened to permit delivery of a workpiece to the pickup station by a piston-cylinder assembly 34 having a cylinder 36 and a piston 38 reciprocable therein to which the gate is connected by a piston rod 40.

Hydraulic fluid pressure from line 42 is delivered to one end or the other of the cylinder 36 by lines 44 and 46, depending upon the position of the valve 48. This valve 48 is normally in a position to deliver pressure fluid to the head end of the cylinder to extend the piston and close the gate. The valve is reversed to open the gate by a solenoid S4.

A stop 50 is provided at the opposite end of the pickup station from the gate to locate and stop a workpiece delivered to the pickup station. A limit switch LS2 is associated with the stop 50.

The receiving station 16, as above noted, is provided in association with the forging press 18 and is disposed on the bed 52 thereof. The ram of the forging press is indicated at 54. When the ram of the press comes down, the receiving station is of course obstructed and transfer of a workpiece thereto by the loading mechanism is not possible. Transfer of a workpiece to the receiving station of the forging press is accomplished when the press is open, that is, when the ram is up and spaced a considerable distance above the bed of the press.

The transfer arm 12 of the loading mechanism 10 is secured to a horizontal shaft 56 which is disposed below the rollers 20 of the pickup station 14 and extends normal to the axes of the rollers so that the transfer arm swings in a vertical plane parallel to rollers 20. The shaft 56 rotates in housing 57.

The transfer arm 12 is oscillated between the pickup station 14 and the receiving station 16 by a piston-cylinder assembly 58 having a piston 60 reciprocable in a cylinder 62 and a rack 64 formed on the piston rod 65. The rack 64 meshes with a pinion 68 secured to the shaft 56.

Hydraulic pressure fluid from line 70 is delivered to one end or the other of the cylinder 62 by lines 72 and 74, depending upon the position of valve 76. This valve in its normal position directs pressure fluid to the rod end of the cylinder to swing the transfer arm to its position adjacent the pickup station 14. A stop 78 is provided to locate the arm 12 and determine the limit of its movement toward the pickup station. A solenoid S7 controls the valve 76 and when energized shifts the valve to direct pressure fluid to the head end of the cylinder, causing the transfer arm 12 to swing to the dotted line position shown in FIGS. 1 and 3 in which it is adjacent the receiving station 16, such position being determined by the stop 80.

A deceleration valve DV is provided in the return line 84 from valve 76. This deceleration valve is controlled by a cam 86 fixed upon the shaft 56. The shape of the cam is such that throughout the major mid-portion of the movement of the arm from one station to the other the deceleration valve is open and has no restrictive action upon the flow of fluid in the return line 84 and thus no decelerating effect upon such movement. However, throughout a minor portion of the movement of the arm adjacent each station, the cam operates the deceleration valve to restrict the return line 84 and materially slow the movement of the transfer arm. The result is that when moving from one station to the other, the transfer arm will move slowly through a minor initial portion of its movement, then move rapidly through a major portion of its movement and thereafter move slowly in a final minor portion of its movement.

The transfer arm 12 is narrower than the distance between the two outer rollers 20 and has openings 88 adjacent the free end which clear the inner rollers 20 so that the arm may move to the pickup position without interference with the rollers (see FIG. 2). The arm 12 has a fixed clamping abutment 90 on its free end. A movable clamping member 92 is formed as the rod extension of a piston 94 in cylinder 96 of piston-cylinder assembly 98 mounted on the arm 12. The clamping member 92 moves between the two inner rollers 20. The clamping abutment 90 and clamping member 92 comprise the clamp 93 for gripping a workpiece under the control of the piston-cylinder assembly 98. When the transfer arm 12 is at the pickup station with the clamp open, the workpiece may be advanced to a waiting position on the grooved rollers 20 through the open clamp, as will be understood with reference to FIGS. 1 and 2.

The piston-cylinder assembly 98 is operated by pressure fluid in line 100 which is delivered to one end or the other of the cylinder 96 by lines 102 and 104 depending upon the position of valve 106. In its normal position, valve 106 delivers pressure fluid to the rod end of the cylinder 96 to unclamp the work. The valve may be shifted to deliver pressure fluid to the head end of the cylinder and clamp the work upon energization of a solenoid S6.

The operation of the loading mechanism will now be described with reference to the wiring diagram shown in FIG. 5. When the transfer arm 12 moves in a clockwise direction toward the pickup station, it ultimately engages and comes to rest against stop 78. This is the pickup position of the transfer arm in which it engages and closes limit switch LS1 to energize solenoid S4. At this time the clamp 93 is open. Energization of solenoid S4 operates valve 48 to deliver pressure fluid to the rod end of cylinder 36 and open gate 32, allowing a workpiece to be delivered by conveyor 26 to the pickup station 14 through the open clamp. The workpiece advances in the grooves 24 of the free-turning rollers 20 and comes to rest when it engages stop 50. When the workpiece engages stop 50, it operates limit switch LS2 to open the normally closed contact LS2a of LS2 in the circuit of solenoid S4 to deenergize the solenoid and close the gate 32. Limit switch LS2 has a normally open contact LS2b in the circuit of solenoid S5 which now closes to energize solenoid S5. Energization of solenoid S5 causes its normally open contact S5a to close in the circuit of solenoid S6 to energize solenoid S6 and shift valve 106 to a position directing pressure fluid to the head end of cylinder 96 to close the clamp and grip the workpiece at the pickup station. Solenoid S6 has a contact S6a in a sealing circuit around contact S5a to maintain the circuit to solenoid S6 closed even after solenoid S5 is deenergized.

Solenoid S5 has a second contact S5b in the circuit of time-delay relay TD which closes to energize the relay and close the relay contact TD1 in the circuit of solenoid S7. Solenoid S7 is the solenoid which controls the movement of the transfer arm. The transfer arm is now ready to move to the receiving station as soon as the press opens. The time-delay relay TD produces a time delay and assures that solenoid S6 will be energized before solenoid S7 so that the transfer arm will not move away from the pickup station until after the clamp 93 closes to grip the work. When the press opens, it closes a switch P, completing the circuit through solenoid S7, causing valve 76 to direct pressure fluid to the head end of cylinder 62 and move the transfer arm to the receiving position as shown in dotted lines in FIGS. 1 and 3. When the transfer arm moves away from the pickup station, limit switch LS2 is released and its contacts LS2a and LS2b return to their normal positions shown. The opening of contact LS2b deenergizes solenoid S5 which results in deenergization of relay TD which opens relay contact TD1 in the circuit of solenoid S7, but the circuit to solenoid S7 remains closed through the sealing circuit established by contact S7a around contact TD1.

The receiving position of arm 12 is determined by engagement of the transfer arm with stop 80. In the receiving position, the transfer arm closes limit switch LS3, thereby energizing solenoid S8. Solenoid S8 has a normally closed contact S8a in the circuit of solenoid S6 which now opens to deenergize solenoid S6. Deenergization of solenoid S6 causes valve 106 to return to its normal position directing pressure fluid to the rod end of the clamp cylinder to release the workpiece and deposit it at the receiving station. Solenoid S8 has a normally open contact S8b in the circuit to time-delay relay TD2 which closes to energize the relay. Time-delay relay TD2 has a normally closed contact in the circuit of solenoid S7 which now opens to deenergize solenoid S7. Deenergization of solenoid S7 allows valve 76 to return to its normal position, delivering pressure fluid to the rod end of cylinder 62 to return the transfer arm to the pick-up station and repeat the cycle. The time-delay relay TD2 produces a time delay and assures that solenoid S6 will be deenergized before solenoid S7 so that the transfer arm will not move away from the receiving station until after the clamp 93 opens to release the work.

What I claim as my invention is:

1. Loading mechanism for a forging press or the like having a work receiving station, said mechanism comprising, a work pickup station having means providing a work-supporting surface, a transfer member movable from said receiving station across said work-supporting surface to a pickup position at said pickup station and from said pickup position at said pickup station across said work-supporting surface to said receiving station, a work clamp on said transfer member, means for advancing said transfer member from said pickup position at said pickup station to said receiving station, means for closing said clamp, means for opening said clamp, conveyor means for advancing a workpiece to said work-supporting surface, a gate operative when open to admit a workpiece to said work-supporting surface, means operative to open said gate in response to the return of said transfer member to said pickup position at said pickup station, means operative to close said gate in response to the presence of a workpiece on said work-supporting surface, means operative when said transfer member is in said pickup position at said pickup station to operate said clamp closing means and said transfer member advancing means in sequence to clamp the work and advance the same to said receiving station, and means operative when said transfer member is at said receiving station to operate said clamp opening means and said transfer member returning means in sequence to release the work and return said transfer member to said pickup station.

2. Loading mechanism as defined in claim 1, wherein said pickup station has a plurality of laterally spaced, parallel rollers having aligned grooves which together provide said work-supporting surface, said transfer member having clearances to clear said rollers when moving across said work-supporting surface to or from said pickup station.

3. Loading mechanism as defined in claim 2, wherein said transfer member has portions which extend between certain of said rollers when moving across said work-supporting surface to or from said pickup station and said clearances comprise openings in said transfer member.

* * * * *